United States Patent [19]
Hardwick et al.

[11] Patent Number: 5,848,785
[45] Date of Patent: Dec. 15, 1998

[54] SHEET MATERIAL FEEDING AND UNLOADING APPARATUS

[75] Inventors: Lionel Charles Hardwick; Malcolm Littlewood, both of Whitchurch, United Kingdom

[73] Assignee: Lomir Engineering Limited, United Kingdom

[21] Appl. No.: 693,453

[22] Filed: Aug. 7, 1996

[30] Foreign Application Priority Data

Aug. 10, 1995 [GB] United Kingdom .................... 9516418

[51] Int. Cl.$^6$ ....................................... B65H 5/08
[52] U.S. Cl. .................... 271/11; 271/14; 271/10.02; 271/10.03; 271/93; 271/262; 271/265.04; 271/267
[58] Field of Search ............................. 271/11, 14, 10.02, 271/10.03, 93, 102, 104, 107, 262, 263, 265.04, 267; 414/797, 796.9

[56] References Cited

U.S. PATENT DOCUMENTS

| | | | |
|---|---|---|---|
| 3,740,029 | 6/1973 | Bays | 271/11 |
| 4,547,115 | 10/1985 | Charbonnet | 414/797 X |
| 4,804,173 | 2/1989 | Pol et al. | 271/11 |
| 5,507,616 | 4/1996 | Perobelli et al. | 414/797 X |

*Primary Examiner*—David H. Bollinger
*Attorney, Agent, or Firm*—Trexler, Bushnell, Giangiorgi & Blackstone, Ltd.

[57] ABSTRACT

Apparatus for feeding and unloading sheets of material, including a first sheet attraction device for lifting a topmost sheet from a stack; a device for checking that only a single sheet has been lifted; and a second sheet attraction device movable between operable and inoperable positions, whereby when in the operable position the second sheet attraction device can be attached to a sheet adhering beneath the topmost sheet, the first and second sheet attraction devices can be moved apart to separate the adhering sheets, and the topmost sheet suspended beneath the first sheet attraction device can be carried away.

9 Claims, 8 Drawing Sheets

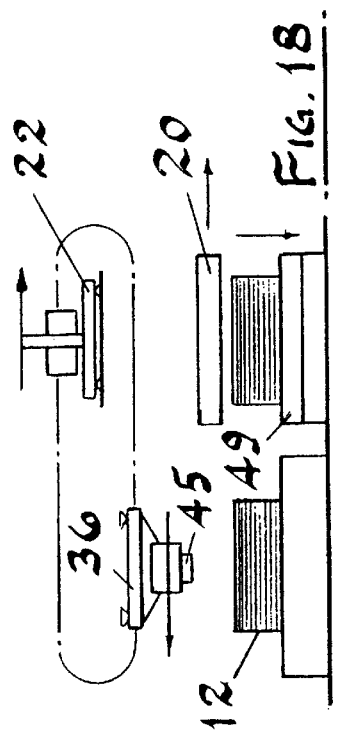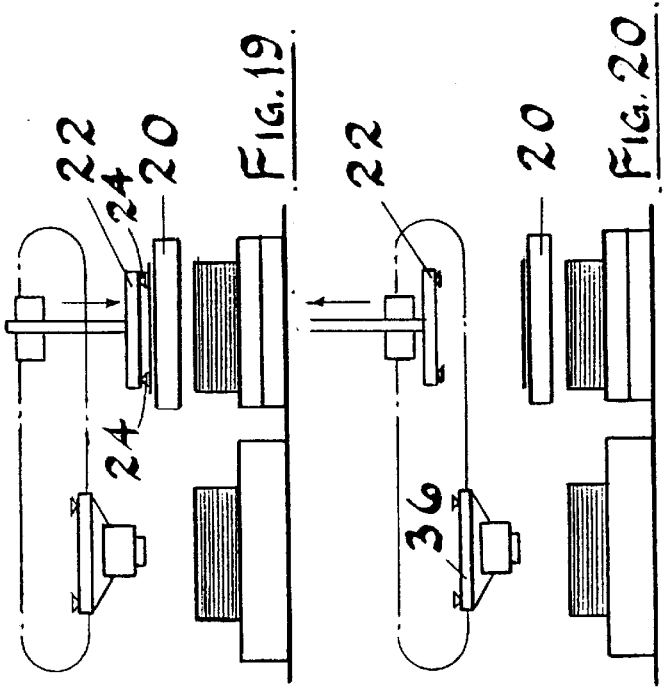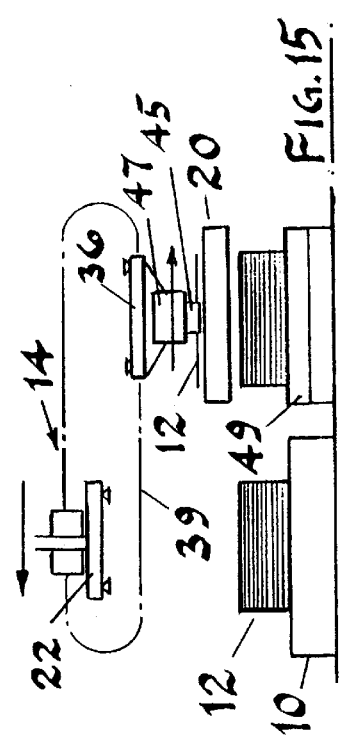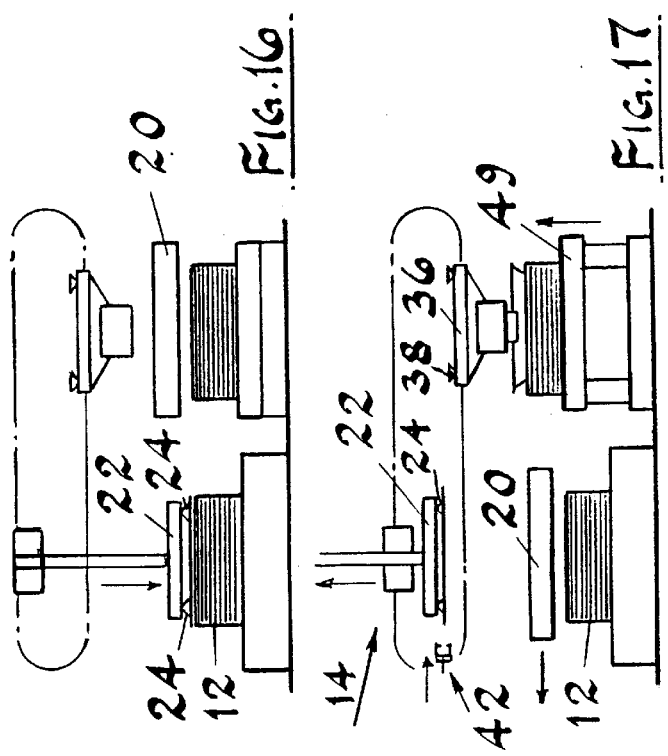

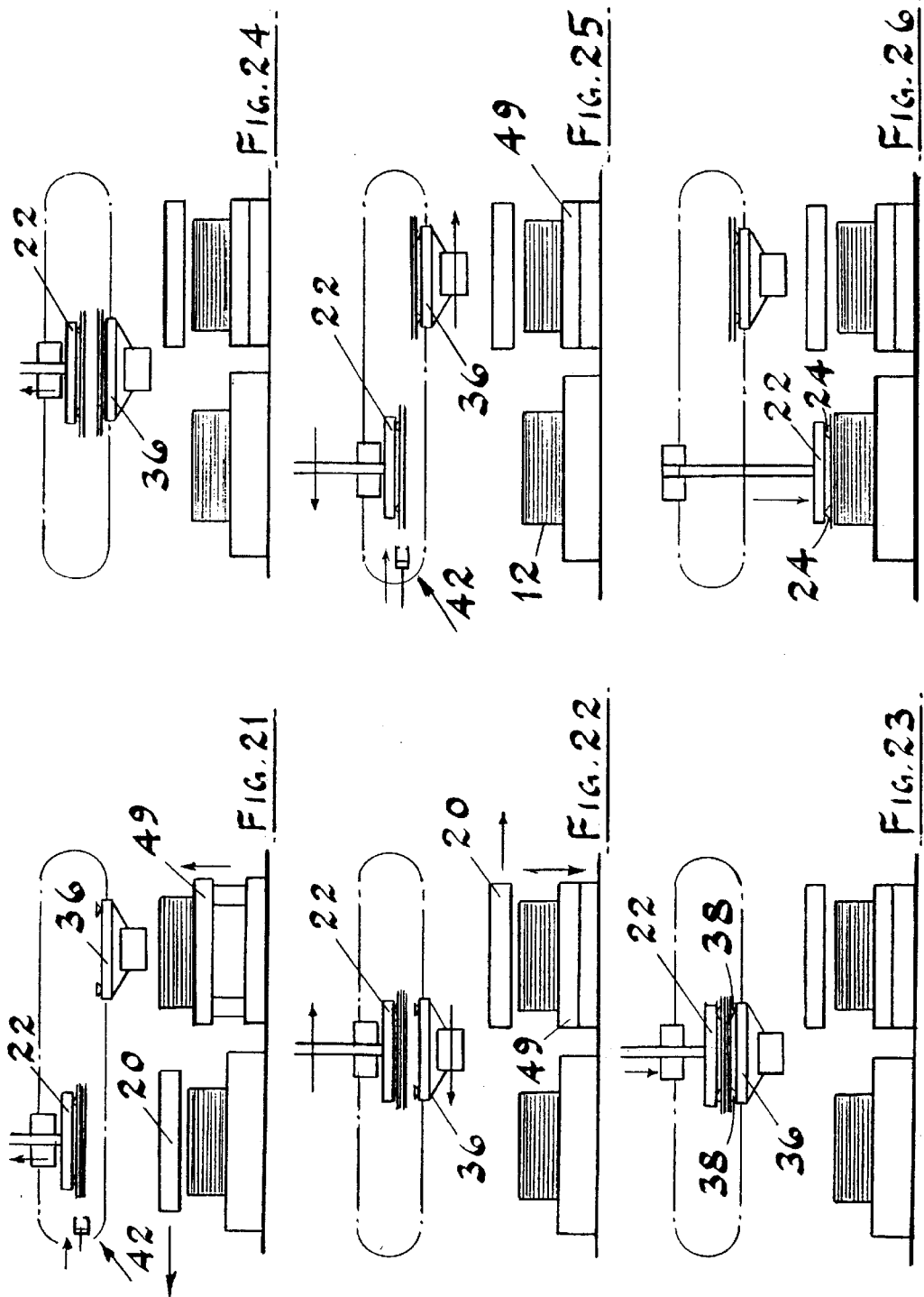

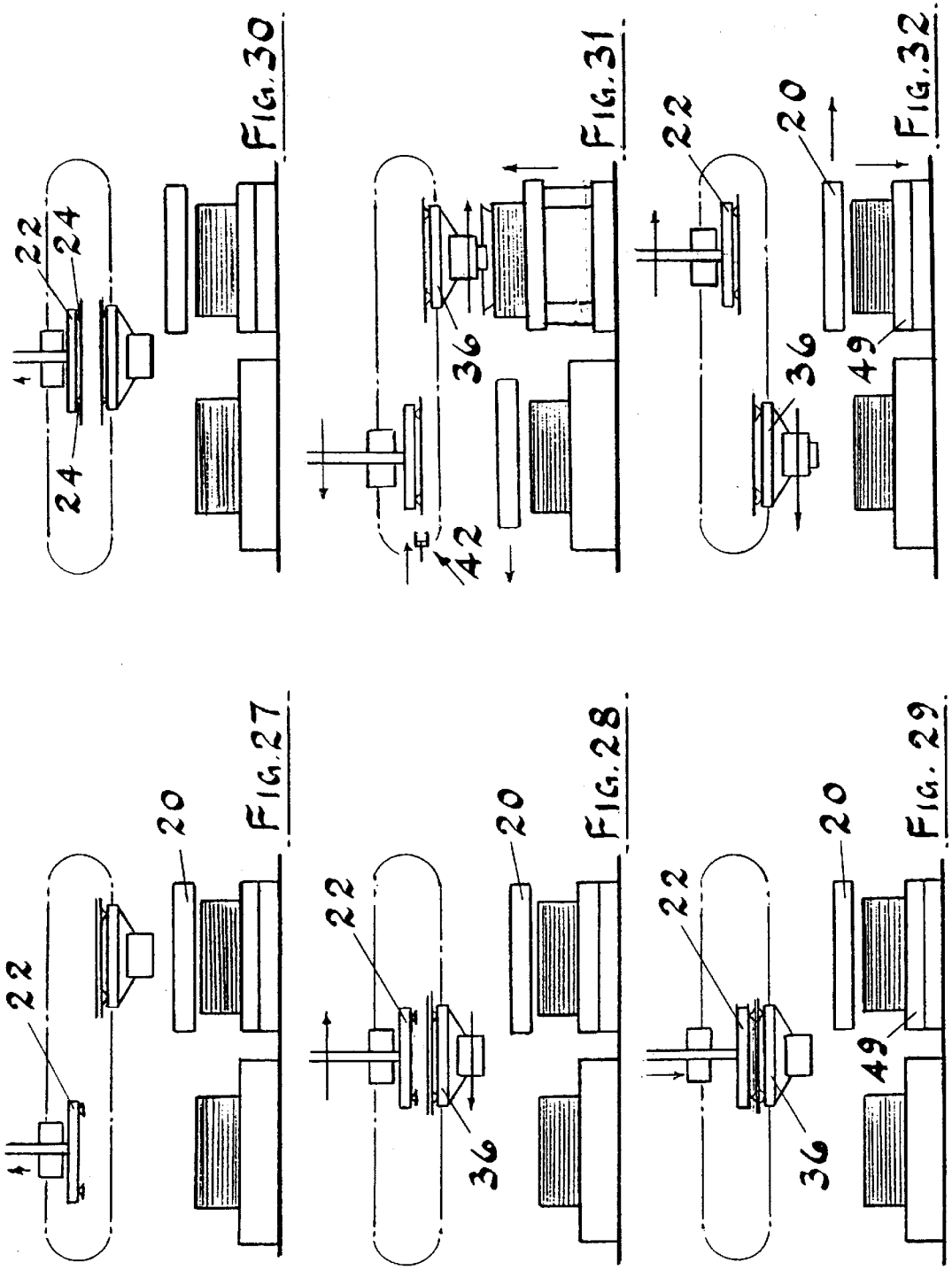

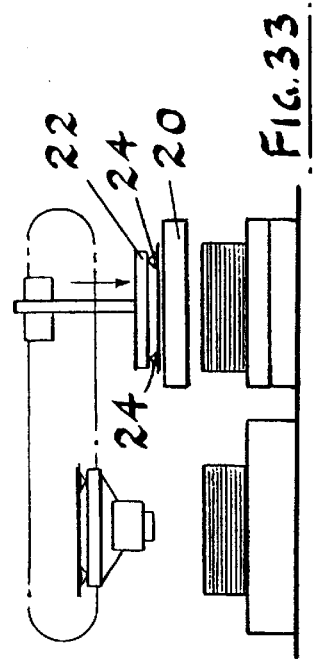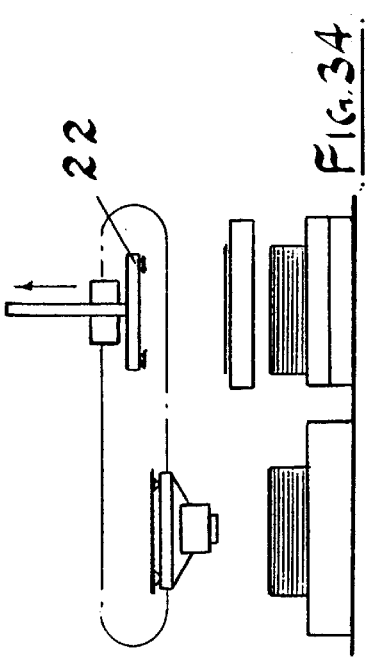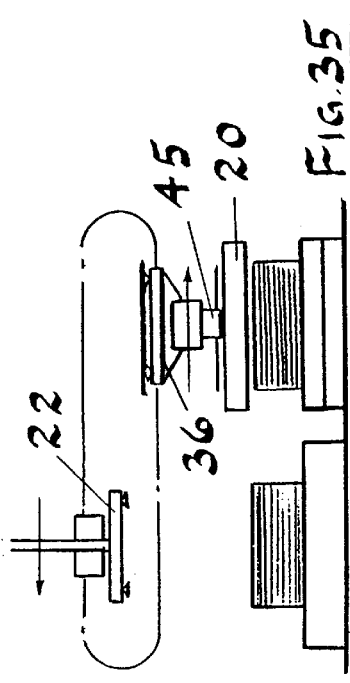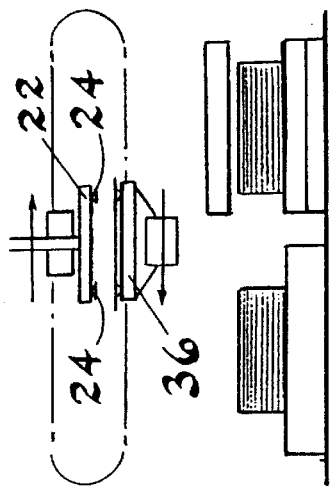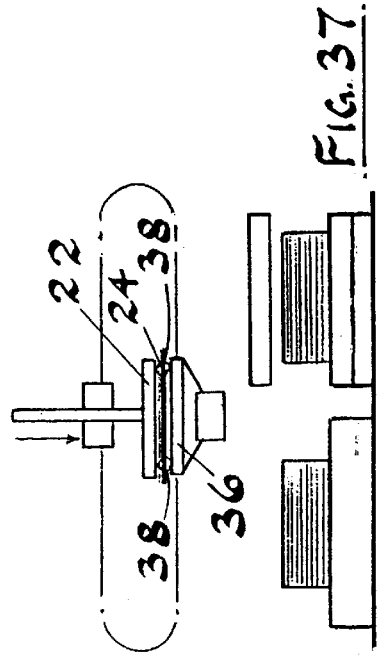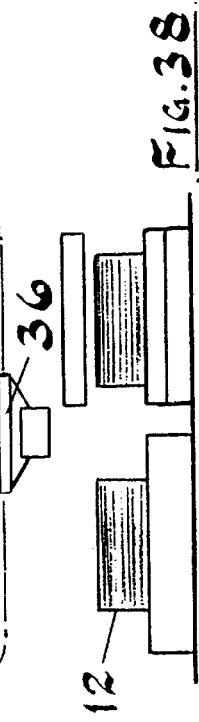

SHEET MATERIAL FEEDING AND UNLOADING APPARATUS

FIELD OF THE INVENTION

The invention relates to sheet material feeding and unloading apparatus, for example for feeding sheets of material, in turn, from a stack of such sheets to a CNC machine tool, and subsequently unloading them therefrom.

Sheet material feeding apparatus for feeding the sheets, in turn, to an automatically operable machine tool is required to be of rapid operation so that it does not slow down the operating cycle of the machine tool. It must also be highly reliable so that malfunction of the feeding apparatus does not bring the automatic operation of the machine tool to a halt.

A particular problem in the operation of sheet material feeding apparatus is that of two or more sheets being picked up simultaneously from a stack of such sheets instead of one sheet. Two or more sheets of material may stick together for any of a number of reasons. For example, if the sheets are metal sheets which have been rolled flat, any trace of oil between the sheets may cause them to 'wring' together quite easily. Other sheet materials, such as sheets of aluminium or of particular plastics materials, are prone to adhere together, especially if they have been stacked for some time in which case the lowermost sheets may have been under some considerable pressure.

Malfunctions of sheet material feeding apparatus caused by the problem just mentioned, if not detected and immediately corrected will invariably affect the operation of a machine tool to which the sheets are being fed, either bringing it to a halt or even causing damage to the machine. Indeed, depending on the nature and size of the sheets, such a malfunction may be a serious safety hazard to operatives in the vicinity of the apparatus or machine tool concerned.

Various attempts have been made to combat this problem, ranging from apparatus designed to flex each sheet as it is lifted from a stack, so that any adherence to a sheet beneath it tends to be broken (but this is of course of little effect when the sheets concerned are, for example, substantial metal sheets which are unable to be flexed to any appreciable extent), to apparatus including air jets directed towards the edges of the sheets so that any sheet adhering beneath a sheet which has been picked up will tend to be separated therefrom by the jets of air (but apparatus of this sort is only of use for separating relatively light and flexible sheets of material). Magnetic devices have also been employed but have only been of use when the sheets concerned have been of ferrous metals. None of these previous attempts to solve the problem have been completely successful.

SUMMARY OF THE INVENTION

According to one aspect of the invention, there is provided a method of feeding sheets of material in turn from a stack of such sheets to a means of transportation away from said stack to a workstation, the method including the lifting of each sheet in turn from the top of the stack of sheets by first sheet attraction means, the step of checking that only a single sheet has been lifted from the stack of sheets, which in the affirmative will cause the feeding operation of said single sheet to continue, that is to say the carrying of said sheet to said means of transportation away from the stack of sheets by said first sheet attraction means, but in the negative will cause further feeding to be inhibited and simultaneously initiate further steps in the process, that is to say the step of bringing second sheet attraction means into position beneath the plurality of sheets suspended beneath the first sheet attraction means, the step of causing said second sheet attraction means to be attached to an underlying one of said sheets, and the step of moving said first and second sheet attraction means apart to separate the adhering sheets, following which the step of carrying a single sheet suspended beneath the first sheet attraction means to the means of transportation away from the stack can be performed.

According to another aspect of the invention, apparatus for feeding sheets of material in turn from a stack of such sheets to a means of transportation away from said stack to a workstation includes first sheet attraction means for lifting a topmost sheet from said stack of sheets, means for checking that only a single sheet has been lifted by said first sheet attraction means; and second sheet attraction means movable between operable and inoperable positions, the arrangement being such that, when the checking means has detected more than one sheet suspended beneath said first sheet attraction means, the second sheet attraction means is movable to its operative position beneath the at least two adhering sheets to be attached to the underlying sheet, whereupon the first and second sheet attraction means can be moved apart to separate the sheets, and a single sheet suspended beneath the first sheet attraction means can be carried to the means of transportation away from the stack.

BRIEF DESCRIPTION OF THE DRAWINGS

FIGS. 15 to 38 are views similar to FIG. 13, but drawn to a much reduced scale, which illustrate diagrammatically the function of this modified form of apparatus.

DESCRIPTION OF THE PREFERRED EMBODIMENT

Figure 2:
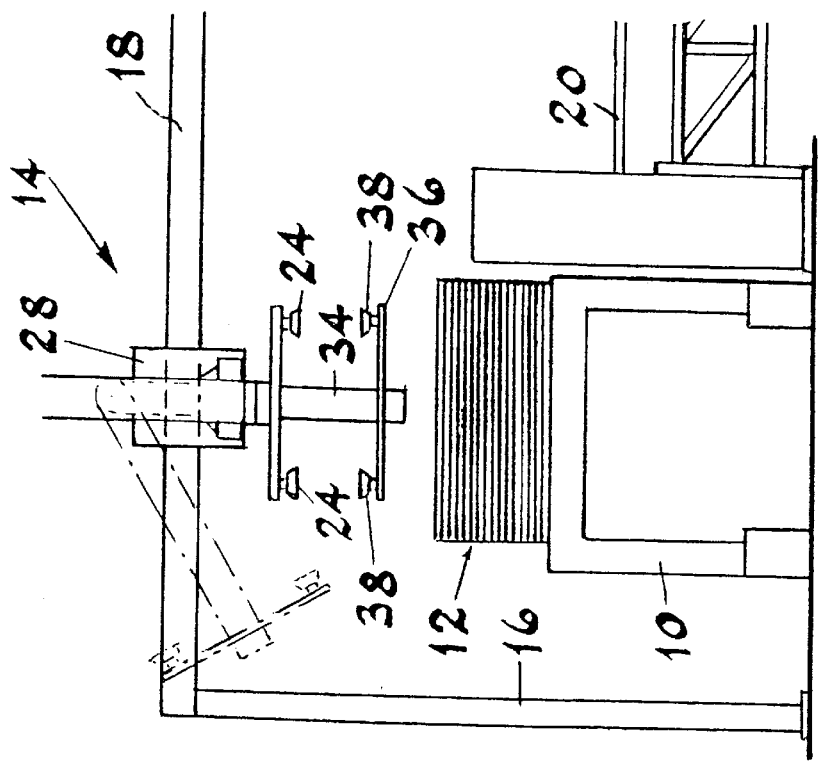
FIG. 2 is an end view thereof.
Figure 1:
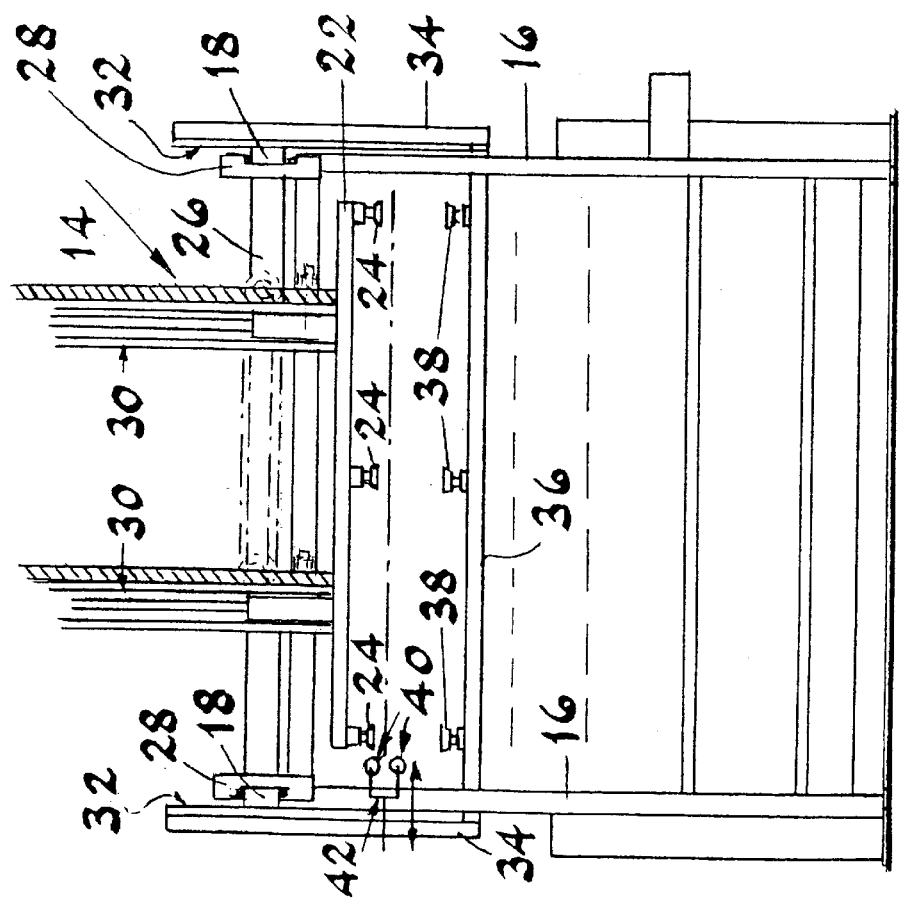
FIG. 1 is a front elevation of sheet feeding and unloading apparatus embodying the invention.

Referring now to FIGS. 1 and 2 of the drawings, the sheet feeding apparatus there illustrated includes a de-stacking table 10, on which a stack of blank sheets 12 is located, and includes also pick-up mechanism, generally indicated 14, for picking up and transferring the sheets 12 in turn to a machine tool (not shown) hereinafter referred to as a workstation.

The pick-up mechanism 14 is mounted on bridging structure including upstanding support legs 16 and horizontally extending support rails 18 along which the pick-up mechanism 14 can travel to deposit sheets picked up from the stack of sheets onto a transfer table 20 on which they will be carried to the workstation.

The pick-up mechanism 14, which includes first sheet attraction means constituted by a main suction frame 22 provided with a plurality of downwardly facing vacuum cups 24, is carried by a cross beam 26 the opposite ends of which are connected to guide blocks 28 slidably mounted on the support rails 18. Means (not shown) are provided for controlling the travel of the guide blocks along said support rails when a sheet of material which has been lifted from the stack of sheets is to be moved laterally towards the transfer table, and for effecting a return movement of the pick-up mechanism when the sheet has been deposited thereon.

Means (not shown) are also provided for adjusting the positioning of the pick-up mechanism longitudinally of the cross beam. Means including a pair of powered guide pillars 30,30 are provided for lifting and lowering the main suction frame relative to the cross beam beneath which it is carried.

In addition to carrying the cross beam 26, the horizontal support rails 18 have a pair of upstanding brackets 32,32 near the upper ends of which are pivotally connected a pair of depending arms 34,34 the lower ends of which carry between them second sheet attraction means constituted by an auxiliary suction frame 36 having a plurality of upwardly facing vacuum cups 38. As shown in FIG. 2, the auxiliary suction frame can be moved (by means not shown) from an operative position in which it is shown in full lines to an inoperative position in which it is shown in chain-dotted lines.

A further feature of the apparatus is a gauging apparatus, constituted by a pair of spaced apart rollers 40,40 carried by a slidably mounted gauging head 42, the latter being carried by one of the support legs at a height to which a topmost sheet of the stack of sheets is raised before being moved laterally towards the transfer table. The apparatus is programmed so that the thickness of sheet is checked each time the main suction frame is raised to this height; only if the thickness check is correct, proving that only a single sheet is suspended beneath said main suction frame, is the feeding cycle able to proceed.

Figure 3:
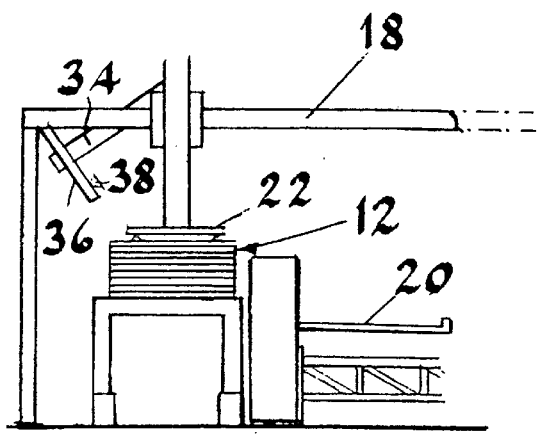
FIGS. 3 to 12 are views similar to FIG. 2, but drawn to a much reduced scale, which illustrate diagrammatically the function of the apparatus.
Figure 4:
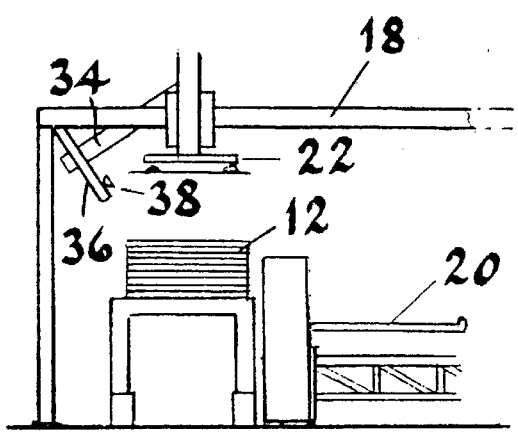
Figure 5:
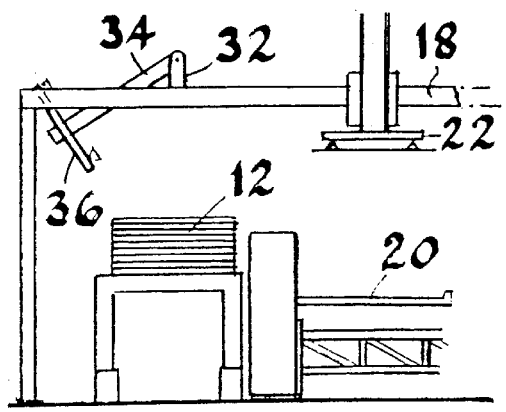
Figure 6:
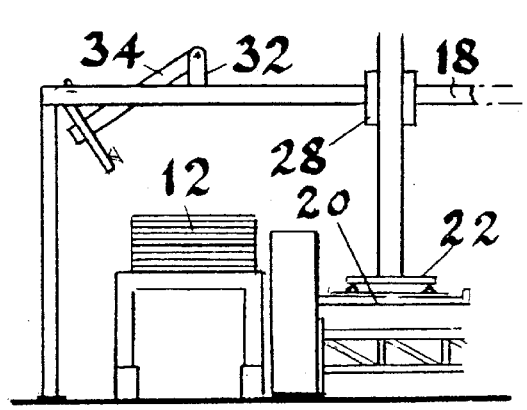

The arrangement is such that, during operation of the apparatus, when the vacuum cups 24 of the main suction frame have been brought into overlying contact with a topmost one of the stack of sheets (see FIG. 3) air can be extracted therefrom by means of a vacuum system (not shown) to which said vacuum cups are connected. The apparatus can then be operated to lift, move laterally and lower said topmost sheet onto the transfer table (as shown in FIGS. 4 to 6) that is of course assuming that the apparatus operates as intended and only said topmost sheet is lifted from the stack of sheets, this being verified as the sheet is lifted into the position alongside the thickness gauging head; if this is the case, the auxiliary suction frame will remain in its inoperative position throughout.

Figure 7:
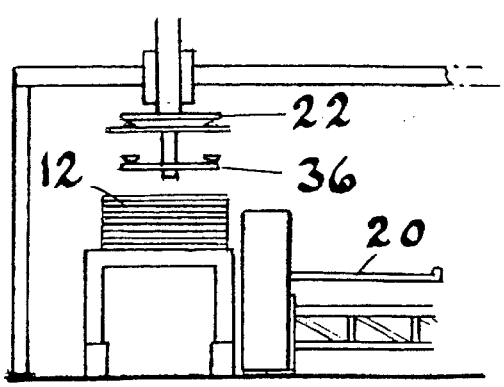
Figure 8:
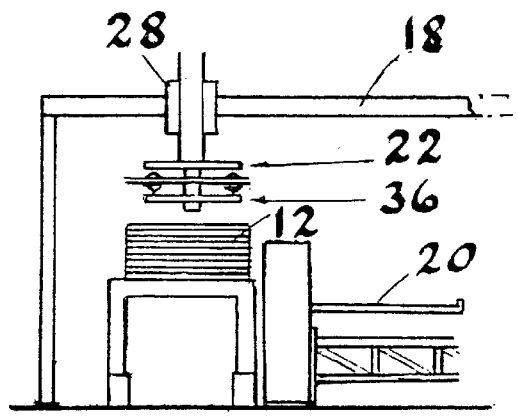
Figure 9:
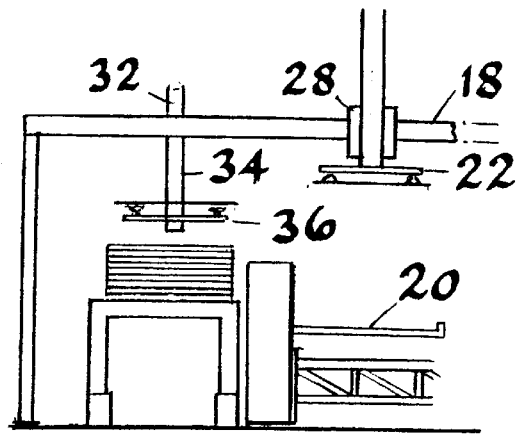

Assuming now that instead of lifting only one sheet from the stack of sheets, the main suction frame has moved upwards from the stack with, say, two sheets suspended beneath it, that is to say with a second sheet attached by self-adhesion beneath the topmost sheet. On movement of the two sheets to the gauge position, the gauging system will have detected more than one sheet and this will have inhibited the lateral movement function of the main suction frame and will have triggered the auxiliary suction frame into operation; in other words the auxiliary suction frame will have moved to its operative position (see FIG. 7) following which the main suction frame will have been lowered sufficiently for the upwardly facing vacuum cups 38 to be attached by to the underside of said second sheet (see FIG. 8). When a separating force is then applied to the sheets by a further upward movement of the main suction frame, the two adhering sheets will be quite easily pulled apart; the delivery of the topmost sheet will be able to proceed in normal fashion (see FIG. 9) the gauging system being used again to check that there is now only a single sheet suspended beneath the main suction frame, whilst the auxiliary suction frame remains for the time being in its operative position. When the main suction frame is next returned for a further sheet, it can take the sheet still resting on the upwardly facing vacuum cups as if it was taking a sheet from the stack of sheets (the vacuum within said upwardly facing cups being released before or as the downwardly facing cups make contact with the sheet). As the sheet is lifted away from the auxiliary suction frame, and the gauging system checks that there is only a single sheet suspended beneath the main suction frame, the auxiliary suction frame will be returned to its inoperative position in readiness for another multiple sheet pick-up condition arising.

Figure 10:
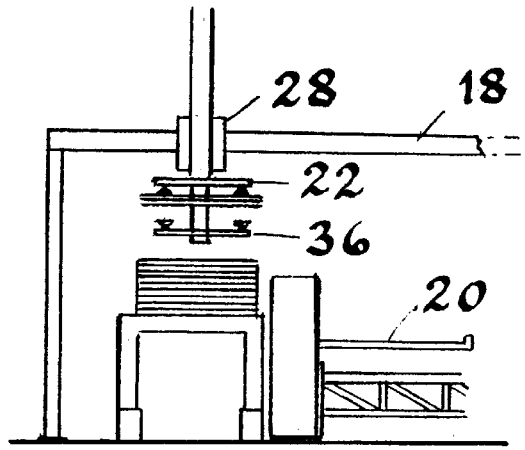
Figure 11:
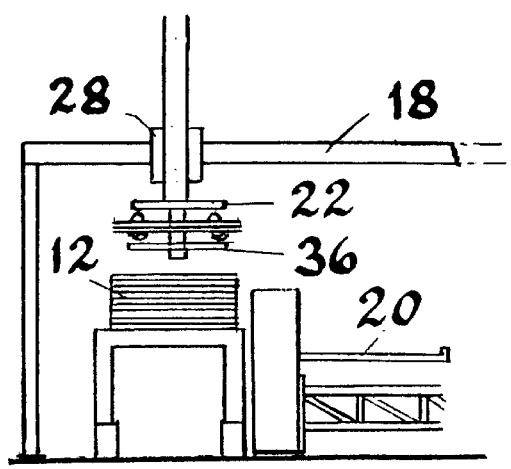

Assuming now that during further operation of the apparatus the main suction frame has moved upwards from the stack of sheets with three sheets attached together by self-adhesion. As before, on movement of the three sheets to the gauging position, the gauging system will have detected more than one sheet and this will have again inhibited the lateral movement function of the main suction frame and triggered the auxiliary suction frame into operation, causing it to move to its operative position (see FIG. 10) following which the main suction frame will have been lowered sufficiently for the upwardly facing vacuum cups 38 to be attached to the underside of the third sheet (see FIG. 11). When a separating force is then applied to the sheets by upward movement of the main suction frame, it may happen that only the topmost sheet is lifted, leaving the remaining two sheets resting on the upwardly facing vacuum cups 38 of the auxiliary suction frame. If this is the case, the delivery of the topmost sheet will be able to proceed in normal fashion, the gauging system verifying that a single sheet is being transferred, following which the main suction frame will be able to return twice in order to take the two remaining sheets, in turn, from their temporary resting place on the auxiliary suction frame. However, if it happens that at the separation of the three sheets the lowermost sheet is detached (see FIG. 12) this requires additional remedial functions of the apparatus because the lifting of the top two still adhering sheets will again have been detected by the gauging system to inhibit the lateral movement function of the main suction frame. In this circumstance, the additional remedial functions, taking place in five main steps, are as follows:

Step 1

Figure 12:
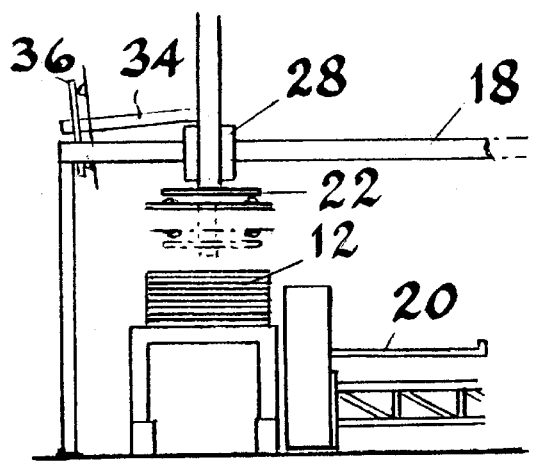

The auxiliary suction frame with vacuum on and holding the lowermost sheet is moved to a retracted position (see FIG. 12).

Step 2

The main suction frame, with the two sheets attached together by self-adhesion, is moved downwards to the stack of sheets, vacuum on said main suction frame is broken and said two sheets are deposited on top of the stack.

Step 3

The main suction frame is moved upwards to the gauging position, whereupon the gauging system detects that no sheet has been lifted and causes the auxiliary suction frame (with sheet still attached) to be returned to its operative position.

Step 4

The main suction frame is moved downwards to the returned sheet still attached to said auxiliary lifting frame; vacuum is applied to the downwardly facing vacuum cups of said main suction frame and broken from the upwardly facing vacuum cups of the auxiliary suction frame; said returned sheet is then raised to the gauging position by said main suction frame, the gauging system checks that there is a single sheet in that position and triggers the movement of the auxiliary suction frame to its inoperative position and permits the main suction frame to continue with its cycle of delivering the sheet to the transfer table.

Step 5

The main suction frame is returned and moved downwards to the stack of sheets, picking up the two still attached sheets and lifting them into the gauging position; as the gauging system detects the double sheet condition, the double sheet separation cycle previously described is triggered into operation.

Figure 13:
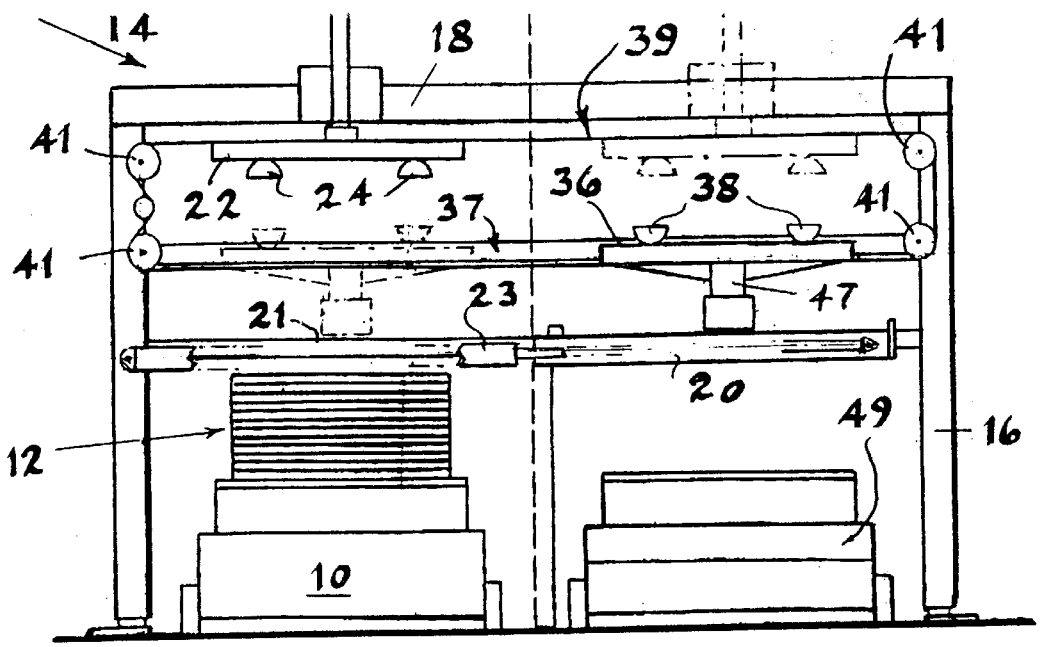
FIG. 13 is a front elevation of a modified form of sheet feeding and unloading apparatus embodying the invention.
Figure 14:
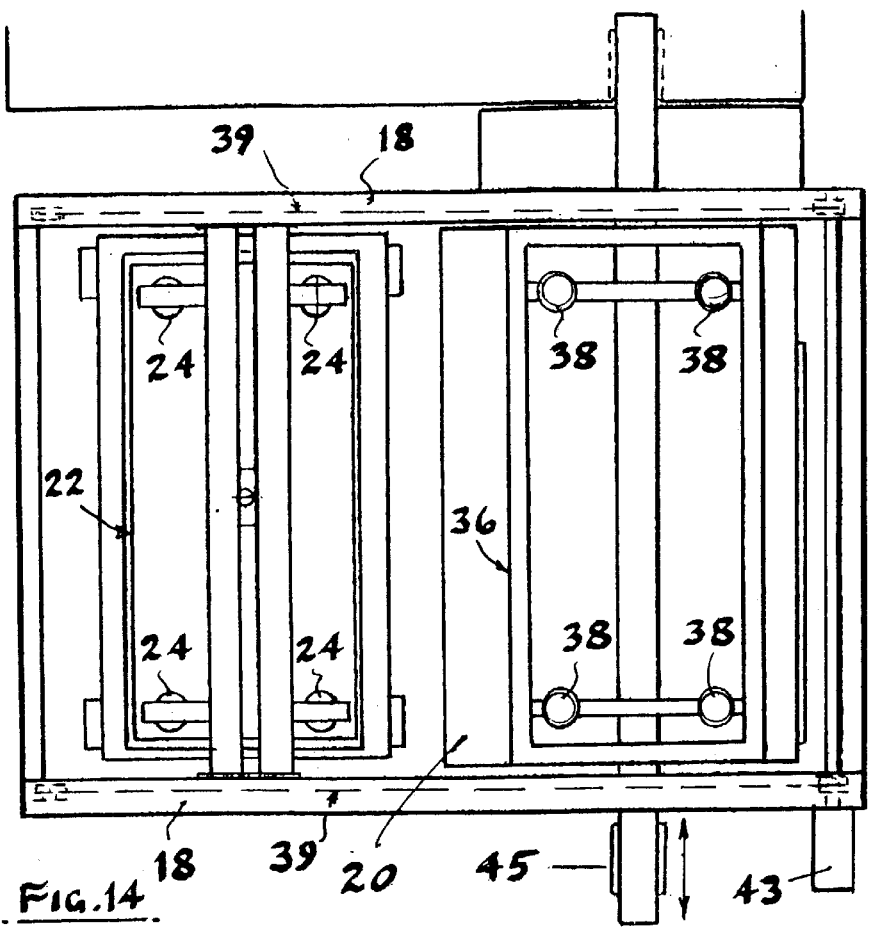
FIG. 14 is a plan view.

Referring now to FIGS. 13 and 14, these illustrate a rather different construction of apparatus embodying the invention but which operates by the same basic method of operation. As shown, this modified apparatus includes a de-stacking table 10, on which a stack of sheets 12 are positioned, and includes also pick-up mechanism 14. The pick-up mechanism is again mounted on bridging structure including support legs 16 and horizontally extending support rails 18 along which the pick-up mechanism 14 can travel between the positions shown in full lines and chain-dotted lines in FIG. 13. The apparatus also includes a transfer table 20 which can receive sheets from the pick-up mechanism, but in this case the transfer table is slidably mounted in horizontal guides 21 for movement between the positions shown in full lines and chain-dotted lines in FIG. 13. A pair of double acting pneumatic rams 23 are provided for moving the transfer table between its two alternate positions.

The apparatus also includes an auxiliary suction frame 36 which can when required be brought into position beneath the main suction frame, but in this case it is slidably mounted in horizontal guides 37 for movement between the positions shown in full lines and chain-dotted lines in FIG. 13. A pair of flexible belts 39 which encircle pairs of pulleys 41,41 at opposite sides of the apparatus are provided for moving the pick-up mechanism 14 and the auxiliary suction frame 36 when required, and since these are connected respectively to upper and lower runs of the belts it will be understood that the main suction frame and auxiliary suction frame are adjusted in position simultaneously along their respective guides with equal and opposite motion. Moreover, when the auxiliary suction frame is brought into position directly beneath the main suction frame, this takes place in a position halfway between their extreme positions of adjustment. A stepping motor 43 is provided for powering an opposite pair of the rollers around which the flexible belts extend, this being controlled by a logic programme.

A pincer unit 45 is mounted on a feeder rail 47 beneath the auxiliary suction frame 36 and is arranged so that, as shown diagrammatically in FIG. 14, it can be used to move sheets to and from a workstation when the transfer table is in the position shown in full lines in FIG. 13; when moving them from the workstation, it moves them onto a table 49 which is adjustable in height.

The operation of the apparatus is as follows:

In FIG. 15, the apparatus is shown in a start position in which the main suction frame 22 is in the up position with the vacuum off. Pincer unit 45 is back in the rest position waiting to collect sheet 12 on transfer table 20 for delivery to the workstation. Table 49 is in the down position.

In FIG. 16, main suction frame 22 is shown to have descended to the stack of sheets 12; vacuum to the vacuum cups 24 has been switched on; and pincer unit 45 on feeder rail 47 has moved forward to deliver the sheet from the transfer table 20 to the workstation.

In FIG. 17, main suction frame 22 is shown to have ascended to the up position, lifting one or more sheets from the stack 12; transfer table 20 has moved sideways to a position beneath the main suction frame; and table 49 has risen to the up position in readiness to receive the finished sheet from the workstation. The gauging head 42 is shown in this view to be operating and, if more than one sheet is detected beneath the main suction frame, a multi-sheet separation cycle will at this point be initiated. The present sequence will otherwise carry on as follows.

In FIG. 18, a finished sheet has been received on table 49 from the workstation and table 49 has then descended to allow transfer table 20 to move into the position above the stack of finished sheets. Simultaneously, the main suction frame 22 carrying a single sheet 12 has moved into position above the stack of finished sheets (and, since the auxiliary suction frame 36 is connected for equal and opposite movement to said main suction frame, the auxiliary suction frame has been moved into position above the stack of blank sheets 12, taking with it the pincer unit 45 depending from said auxiliary suction frame).

In FIG. 19, the main suction frame 22 is shown to have descended to lower the blank sheet carried thereby onto the transfer table 20, vacuum within the vacuum cups 24 having been switched off to deposit the sheet.

In FIG. 20, the main suction frame 22 is shown to have been moved to the up position in readiness for further equal and opposite movements of the two frames to bring the apparatus back to the condition in which it is shown in FIG. 15 and to complete a normal feeding and unloading cycle.

Considering what would have resulted had the gauging apparatus detected a multi-sheet situation at the FIG. 17 stage of the feeding and unloading cycle, reference will now be made to FIGS. 21 to 38.

In FIG. 21, more than one sheet is shown to have been lifted from the stack of sheets 12 by the main suction frame 22 and this has been detected by the gauging apparatus 42.

In FIG. 22, the main suction frame 22 and the auxiliary suction frame 36 are shown to have been moved with equal and opposite movement until they are positioned the one directly above the other. Simultaneously, the transfer table 20 has been moved to a position overlying the table 49 which has been moved to the down position.

In FIG. 23, the main suction frame 22 is shown to have been lowered to bring the sheets carried thereby into contact with the vacuum cups 38 of the auxiliary frame 36. At this point, vacuum has been applied to said vacuum cups.

In FIG. 24, the main suction frame 22 has been raised in order to separate the multiple pack of sheets (and it will be understood that with any pack of three or more sheets this will be a separation in any one of several possible combinations).

In FIG. 25, the main suction frame 22 and the auxiliary suction frame 36 have been displaced laterally with equal and opposite movement so that the main frame has again been positioned above the stack of sheets 12 and the auxiliary frame has been positioned above the stack of finished sheets on table 49. The gauging apparatus 42 is about to operate to check on whether the main suction frame is carrying one sheet or more than one sheet. (If the gauging apparatus detects a single sheet beneath the main suction frame, the apparatus will now operate as from FIG. 31).

In FIG. 26, it has been found that the main suction frame 22 was carrying more than one sheet; said main frame has thus descended to place the top part of the separated pack on the stack of blank sheets 12; vacuum is removed from the vacuum cups 24 of the main frame at that point in order to deposit them.

In FIG. 27, the main suction frame 22 is shown to have ascended to the up position.

In FIG. 28, the main suction frame 22 and the auxiliary suction frame 36 are shown to have again been moved with equal and opposite motion to bring the one directly above the other.

In FIG. 29, the main suction frame 22 has been lowered to contact the uppermost surface of the bottom part of the separated pack still secured by vacuum to the auxiliary suction frame 36.

In FIG. 30, vacuum has been restored in vacuum cups 24 of the main suction frame 22 and the latter has been raised to its up position, thus separating the two sheets of the adhering pack.

In FIG. 31, the main suction frame 22 and the auxiliary suction frame 36 have again moved with equal and opposite motion and the gauging apparatus 42 is shown about to operate to check on whether there is one sheet or more that one sheet suspended beneath the main suction frame; if more than one sheet is detected, the sequence of operations from the FIG. 26 situation will be repeated but will otherwise proceed as follows.

In FIG. 32, the two suction frames 22 and 36 are shown to have again been moved with equal and opposite motion to bring the main suction frame into position above the table 49, the latter having been moved to the down position. Simultaneously, the transfer table 20 has been brought into position above the table 49 in readiness to receive the single sheet being carried by the main suction frame.

In FIG. 33, the main suction frame 22 is shown to have been lowered to place the single sheet on transfer table 20, the vacuum in vacuum cups 24 then being released.

In FIG. 34, the main suction frame 22 has been raised with vacuum off.

In FIG. 35, the auxiliary suction frame 36, with vacuum on and thus still holding the single sheet, is shown to have moved into position over transfer table 20, and at this point the pincer unit 45 picks up the sheet which has been placed on the transfer table and delivers it to the workstation.

In FIG. 36, the two suction frames 22 and 36 are shown to have again moved with equal and opposite motion to bring the one into position directly above the other.

In FIG. 37, the main suction frame 22 is shown to have been lowered to bring the vacuum cups 24 into contact with the sheet carried by the auxiliary suction frame 36. At this point the vacuum to vacuum cups 24 is switched on and the vacuum to vacuum cups 38 of the auxiliary frame is switched off.

In FIG. 38, the main suction frame 22 is shown to have been raised to the up position prior to being moved into position above the stack of blank sheets 12, in other words to assume the position shown at FIG. 17 during the normal feeding and unloading cycle. If the gauging apparatus confirms at that point that the sheet just delivered is indeed only a single sheet, the normal feeding and unloading cycle will then continue from that point onwards.

Thus there is provided sheet material feeding apparatus which it is thought will at least alleviate the dangers of malfunctions arising through two or more sheets adhering together. If fitted with vacuum cups as in the embodiments described and illustrated, it can be used for feeding sheets made of a wide variety of materials. It can be used for the feeding of sheets made of materials known to be prone to the problem previously described. However, it will be understood that whenever single sheets are lifted, that is to say throughout those times when the problem referred to is not in evidence, the transport of sheets away from the stack of sheets by the pick-up mechanism can proceed without the intervention of the second sheet attraction means.

Various further modifications may be made. For example, instead of the auxiliary suction frame being pivotally mounted in the manner illustrated in FIGS. 1 to 12 of the drawings, or mounted in horizontal guides for movement into or out of its operative position as shown in FIG. 13, it could be movable about a vertical axis into or out of its operative position. The flexible belts 39 of the FIG. 13 construction could be replaced by other flexible elements such as endless chain. Furthermore, it is quite possible that, for the feeding of sheets of ferrous materials, the vacuum cups could be replaced by magnetic means. The apparatus for checking that only one sheet has been lifted by the main suction frame could be of a different type to that described and illustrated in the drawings. It need not necessarily be a gauging apparatus; it could for example operate by electronic means or by weighing the load suspended beneath the main suction frame.

If the sheets to be fed from the stack of sheets are of a ferrous metal, the first sheet attraction means could be vacuum means and the second sheet attraction means could be magnetic means. In this way the operation of the apparatus may be improved in the event of three or more sheets being lifted by said first means because, whereas magnetic means can act through the sheets to act in effect on all the adhering sheets, vacuum means can only act directly on a single sheet.

It is not essential for apparatus embodying the invention to be built into a single transfer machine as in the illustrated embodiment. For example, in an installation including a number of industrial robots with end effectors including vacuum means or magnets, two or more adjacent robots could provide the required features of the invention and be controlled to operate as described above.

What we claim is:

1. A method of feeding sheets of material in turn from a stack of sheets to a means of transportation away from said stack to a workstation, the method comprising: lifting each sheet in turn from a top of the stack of sheets by first sheet attraction means; checking that only a single sheet has been lifted from the stack of sheets and is suspended beneath the first sheet attraction means; if it has been determined that only a single sheet has been lifted from the stack of sheets and is suspended beneath the first sheet attraction means, continuing the feeding of said single sheet by carrying said sheet to said means of transportation away from the stack of sheets, suspended beneath said first sheet attraction means; if it has not been determined that only a single sheet has been lifted from the stack of sheets and is suspended beneath the first sheet attraction means, inhibiting further feeding and bringing second sheet attraction means into position beneath a plurality of sheets suspended beneath the first sheet attraction means, causing said second sheet attraction means to be attached to an underlying one of said sheets, and moving said first and second sheet attraction means apart to separate the adhering sheets leaving a single sheet suspended beneath the first sheet attraction means, continuing the feeding of said single sheet suspended beneath the first sheet attraction means carrying said single sheet suspended beneath the first sheet attraction means.

2. Apparatus for feeding sheets of material in turn from a stack of sheets to a means of transportation away from said stack to a workstation, the apparatus comprising: first sheet attraction means forming part of a pick-up mechanism for lifting a topmost sheet from said stack of sheets; means for checking that only a single sheet has been lifted by said first sheet attraction means; and second sheet attraction means movable between an operable position in a path of lifting movement of the sheets and an inoperable position remote from said path of lifting whereby when the checking means has detected more than one sheet suspended beneath said first sheet attraction means, the second sheet attraction means is movable to said operative position beneath sheets lifted by said first sheet attraction means, whereupon the first and second sheet attraction means can be moved apart to separate the sheets so that a single sheet remains suspended beneath the first sheet attraction means and can be carried to the means of transportation away from the stack.

3. Apparatus as claimed in claim 2, further comprising bridging structure comprising upstanding support legs and horizontally extending support rails along which the pick-up mechanism can travel to deposit sheets picked up from a stack of sheets onto a transfer table.

4. Apparatus as claimed in claim 3, including a cross beam the opposite ends of which are connected to guide blocks slidably mounted on the support rails, said cross beam carrying the pick-up mechanism.

5. Apparatus as claimed in claim 3, further comprising a pair of upstanding brackets carried by the horizontally extending support rails, and a pair of depending arms pivotally connected to said brackets, the lower ends of the arms carrying between them the second sheet attraction means for pivotal movement thereof between the operable position in the path of lifting movement of the sheets and the inoperable position remote from said path of lifting movement.

6. Apparatus as claimed in claim 2, further comprising bridging structure comprising upstanding support legs and horizontally extending support rails along which the pick-up mechanism can travel to deposit sheets picked up from a stack of sheets onto a transfer table, and horizontal guides on which are carried an auxiliary suction frame, of which the second sheet attraction means form a part, for movement between operable and inoperable positions.

7. Apparatus as claimed in claim 6, further comprising a pair of flexible elements and pairs of pulleys around which said elements extend, the pick-up mechanism and the auxiliary suction frame being connected, respectively, to upper and lower runs of said elements, whereby said pick-up mechanism and auxiliary suction frame can thereby be adjusted in position simultaneously along their respective guides with equal and opposite motion.

8. Apparatus as claimed in claim 6, including horizontal guides in which the transfer table is slidably mounted for movement between alternate positions overlying the stack of blank sheets and a table for receiving finished sheets from the workstation.

9. Apparatus as claimed in claim 2, in which at least the first sheet attraction means include vacuum cups.

\* \* \* \* \*